(12) United States Patent
Rogovin

(10) Patent No.: US 6,362,584 B1
(45) Date of Patent: Mar. 26, 2002

(54) VIRTUAL SENSOR FOR WINDOW POSITION

(75) Inventor: Dan Rogovin, Thousand Oaks, CA (US)

(73) Assignee: Meritor Light Vehicle Technology L.L.C., Troy, MI (US)

( * ) Notice: Subject to any disclaimer, the term of this patent is extended or adjusted under 35 U.S.C. 154(b) by 0 days.

(21) Appl. No.: 09/552,065

(22) Filed: Apr. 19, 2000

(51) Int. Cl.⁷ .................................................. H02P 7/00
(52) U.S. Cl. ....................... 318/280; 318/445; 318/450; 318/465; 318/466; 318/467; 318/469
(58) Field of Search ................. 318/445, 450, 318/465, 466, 467, 469, 280

(56) References Cited

U.S. PATENT DOCUMENTS

| | | | | |
|---|---|---|---|---|
| 5,705,755 A | * | 1/1998 | Yamamura | 318/445 |
| 5,880,421 A | * | 3/1999 | Tsuge et al. | 318/445 |
| 6,115,966 A | * | 9/2000 | Shibata | 318/445 |

* cited by examiner

*Primary Examiner*—Karen Masih
(74) *Attorney, Agent, or Firm*—Suiter & Associates PC

(57) ABSTRACT

The present invention discloses a novel method and apparatus for determining the position of a window glass in an aperture window as between one of two or more regions. Further, the present invention discloses a method and apparatus for determining the direction of travel of a window. The present invention senses the position and direction of travel of a window by measuring the amount of current in a motor that is suitable for moving the window as the window passes one or more elastic objects.

16 Claims, 5 Drawing Sheets

VIRTUAL SENSOR FOR WINDOW POSITION

FIELD OF THE INVENTION

The present invention relates generally to power window regulators and more specifically to an apparatus and method for determining the position of a window.

BACKGROUND OF THE INVENTION

Power windows in automobiles are known to the art. A passenger in a vehicle is capable of raising or lowering a window by pressing a button generally located near a door release for an automobile. The movement of the window is generally controlled through a power window regulator. Power window regulators monitor the position of the glass from the closed position to the completely open position. Further, power window regulators may provide information regarding position of the glass to anti-squeeze controllers. An anti-squeeze controller may stop the movement of the glass if an obstruction is present between the glass and an upper seal.

Power window regulators known to the art fall into one of two types. The first type of power window regulator tracks the glass position continuously. The second type of power window regulator utilizes a sensor to determine if the glass has passed a predefined location usually close to the upper seal. Both types of power window regulators known to the art are subject to problems. For example, the type of power window regulator that tracks the glass position continuously is subject to numerous corrections. Over time, the numerous corrections that are required may lead to serious discrepancies between the actual glass position and the computed glass position. Also, the continuous glass position tracker type of power window regular renders more information than is necessary for typical anti-squeeze controllers.

The power window regulators that utilize a sensor to determine if the glass has passed a defined point is superior than the continuous tracking type, however it is limited by the high price of the item. With the defined point type of power window regulator, the travel path that the glass follows is divided into two regions or states. In the first state, the glass may encounter an obstruction in the path and the movement of the glass may be adjusted accordingly. In the second state, usually one millimeter from the upper seal, the glass may not encounter an obstruction. As stated, power window regulators are costly as a result of requiring a sensor and wires that communicate sensor data to a microcontroller.

It would be advantageous if a power window regulator existed that has the benefits of a two-state position type with regards to ease in use and reliability that may be utilized with anti-squeeze controllers without a requirement of an actual sensor and wires.

SUMMARY OF THE INVENTION

Accordingly, the present invention is directed to a novel method and apparatus for sensing whether glass has passed a boundary between the two-state space in which it travels along with the direction of travel by modifying a physical parameter of the motor during operation. Further, the present invention is capable of determining the direction of travel of the window glass without requiring a separate sensor and wires.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
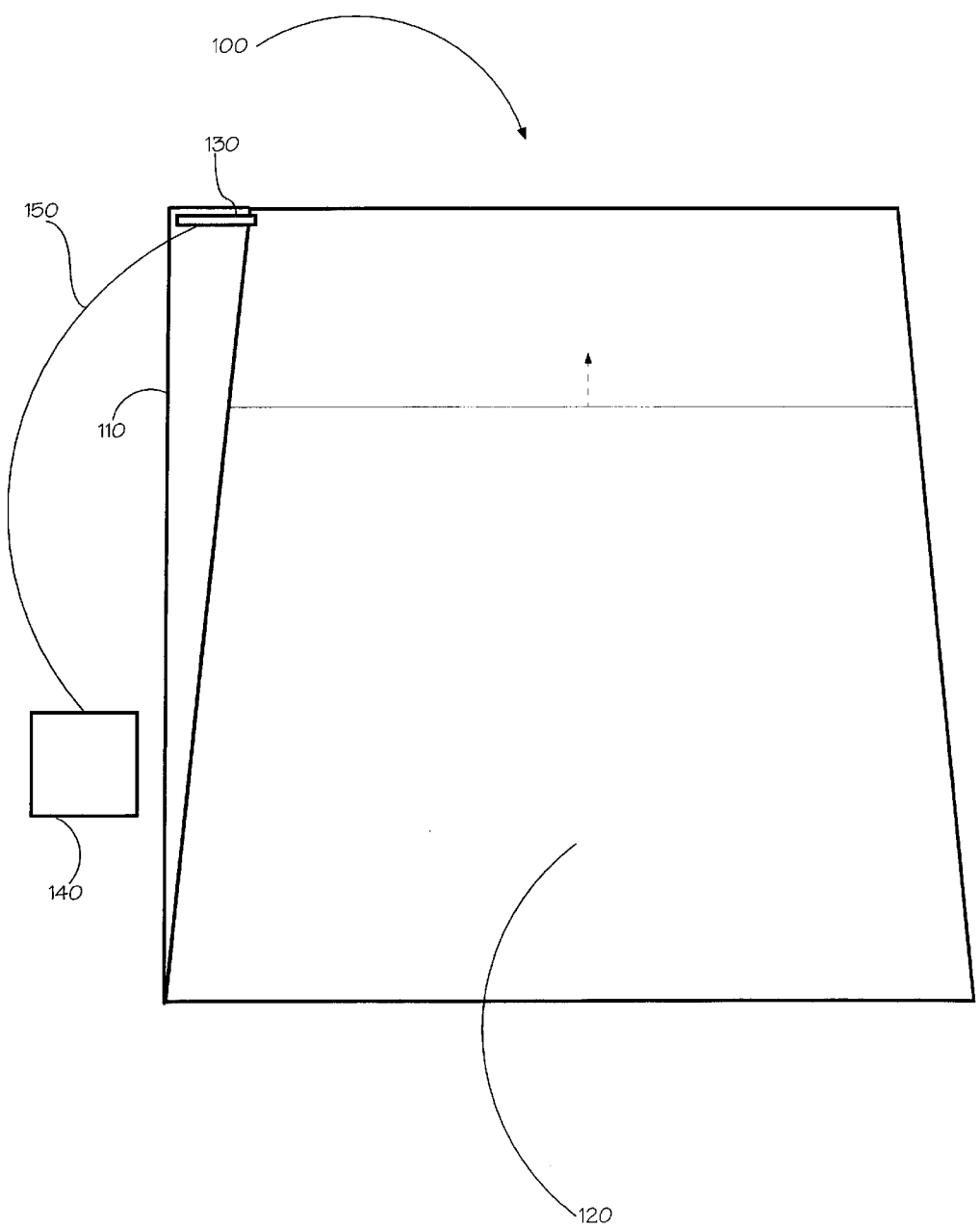
FIG. 1 depicts a two-state position type power window regulator of the prior art.

Referring to FIG. 1, a power window regulator 100 of the prior art is shown. Typically, a section of a door 110 of an automobile has a window 120. The window 120 is generally manufactured from some type of window glass including glass, plastic, or some type of composite of glass and plastic. Generally, the window glass may be raised to the top of the door and lowered into a cross-section of the door 110 to allow air from outside of the automobile to flow inside the automobile. The power window regulator of the prior art includes a sensor 130, a controller 140, and wires 150 connecting the sensor to the controller 140.

Figure 2:
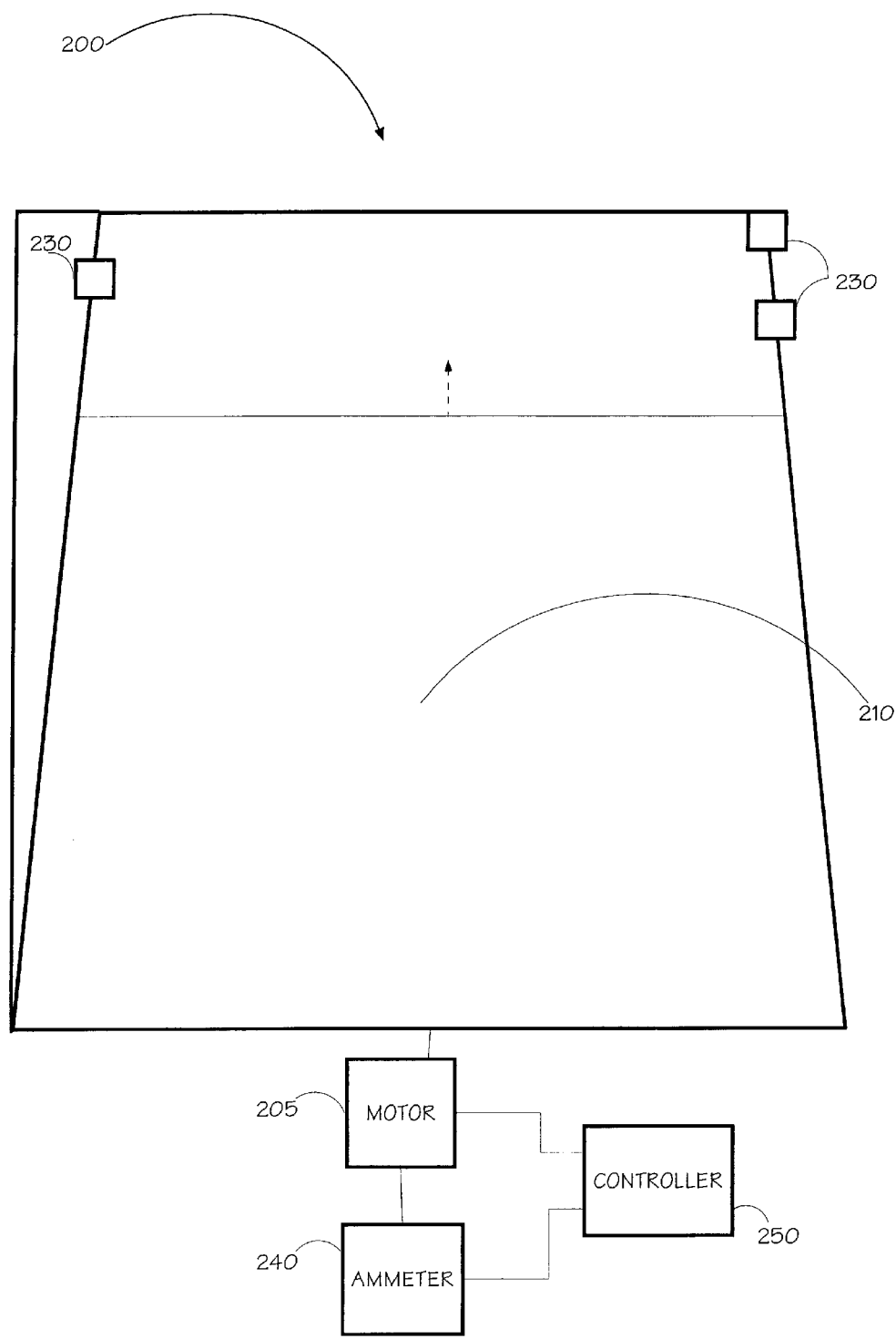
FIG. 2 depicts an exemplary embodiment of the virtual sensor for window position of the present invention.

Referring now to FIG. 2, an exemplary embodiment of the virtual sensor 200 of the present invention is disclosed. In an embodiment of the present invention, the virtual sensor 200 does not require a separate sensor and wires. The virtual sensor 200 comprises a motor 205 for moving the window glass 210, a controller 250, and at least one elastic object 230 placed in the path of the window glass 210.

When the window glass 210 travels either upward or downward, it may pass one or more elastic objects 230. Extra work may be required for the motor 205 when the window glass 210 is traveling upward and it passes an elastic object 230. Less work may be required when the window glass 210 is traveling downward and it passes an elastic object 230. The amount of work for the motor 205 may affect the amount of current necessary for the motor 205 to function properly. For example, when the window glass 210 is traveling upward and passes an elastic object 230, the current in the motor 205 may increase.

In order to measure the current in the motor 205, an ammeter 240 is connected to the motor. Depending upon the real-time current in the motor 205 and the change in current in the motor 205, the controller 250 of the present invention may determine whether the window glass 205 is located in an obstacle region or an obstacle-free region. Further, the controller 250 may also calculate the direction of travel of the window glass 205.

In order to utilize the present invention with anti-squeeze controllers, several elastic objects 230 may be required. If only one elastic object 230 is used, then the controller may not be able to distinguish whether a window glass is passing an elastic object from an obstacle in the path. For example, if an obstacle is within the path of the window glass 210, then an increase in the current in the motor 205 may occur. An increase in the current may also occur if the window glass 210 is moving upward and passes an elastic object 230. In order to distinguish between the two situations, several elastic objects 230 are placed along the path, each elastic object 230 containing a force of less than the 100 Newton mandate for an anti-squeeze controller.

Figure 3:
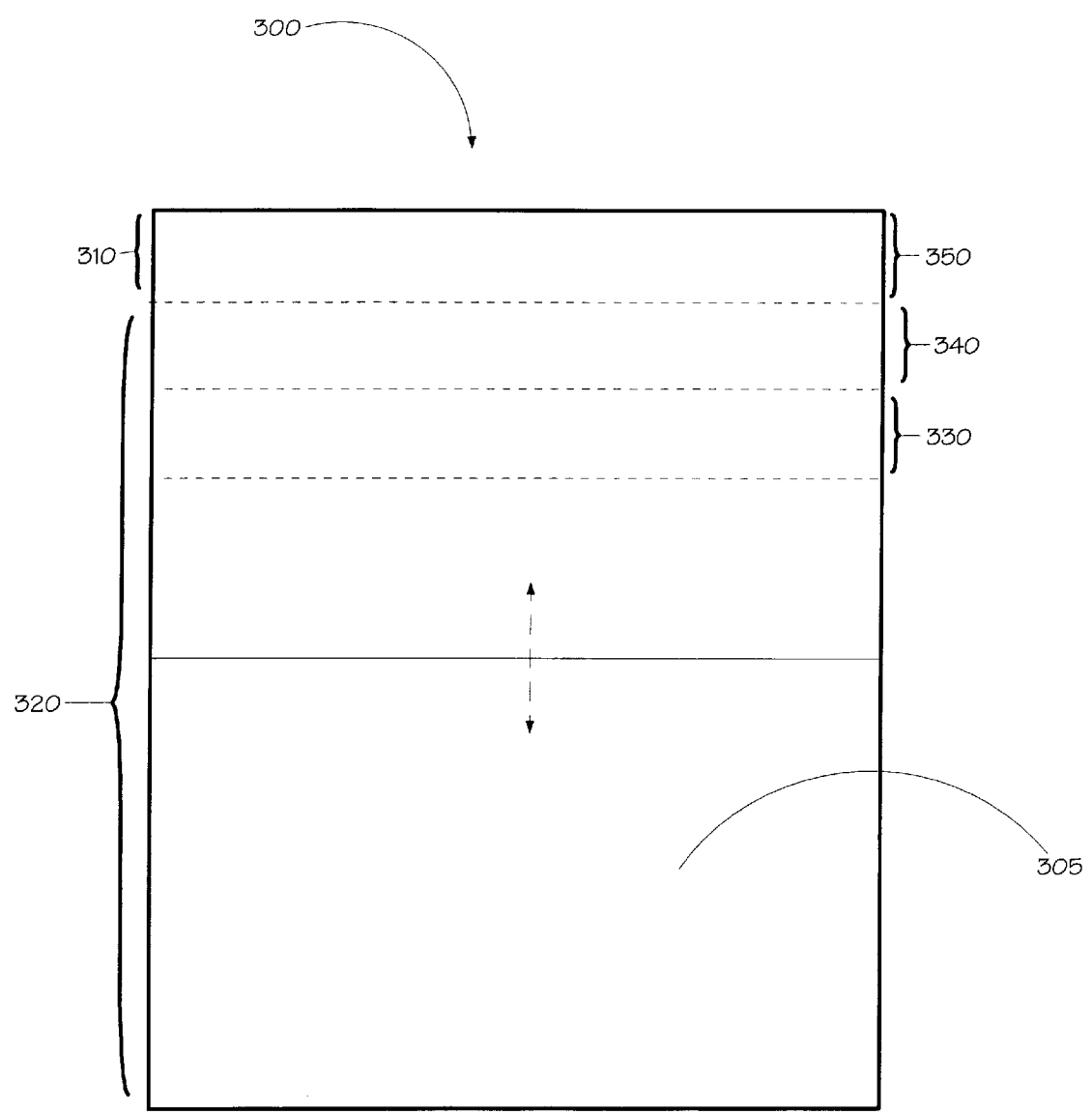
FIG. 3 displays the two regions and areas where the motor current may change according to an exemplary embodiment of the present invention.

Referring to FIG. 3, an example 300 of the adjustment in the amount of current that is required by the motor as a window glass 305 passes several elastic objects. The location of the top of the window glass 305 determines the area and region. In the obstacle-free region 310, the anti-squeeze controller may be disengaged. When the top of the window glass 305 is located within the obstacle region 320, an anti-squeeze controller may be utilized and engaged. A controller (not shown) determines what region the window glass is located in by measuring the current in the motor. For example, when the top of the window glass 305 is located within the lowest area 330, the current in the motor may be a fixed value of x milliamperes. As the window glass 305 passes another elastic object and passes into a middle area 340, the current may be x+10 milliamperes. When the window glass 305 passes into an upper area 350, the current in the motor may be x+20 milliamperes. At this current level, the controller may be aware that the top of the window glass 305 is located in the obstacle-free region 310, thus the anti-squeeze controller may be disengaged. However, when the current level is less than or equal to x+10 milliamperes, the controller may be aware that the window glass 305 is located within the obstacle region 320.

Figure 4:
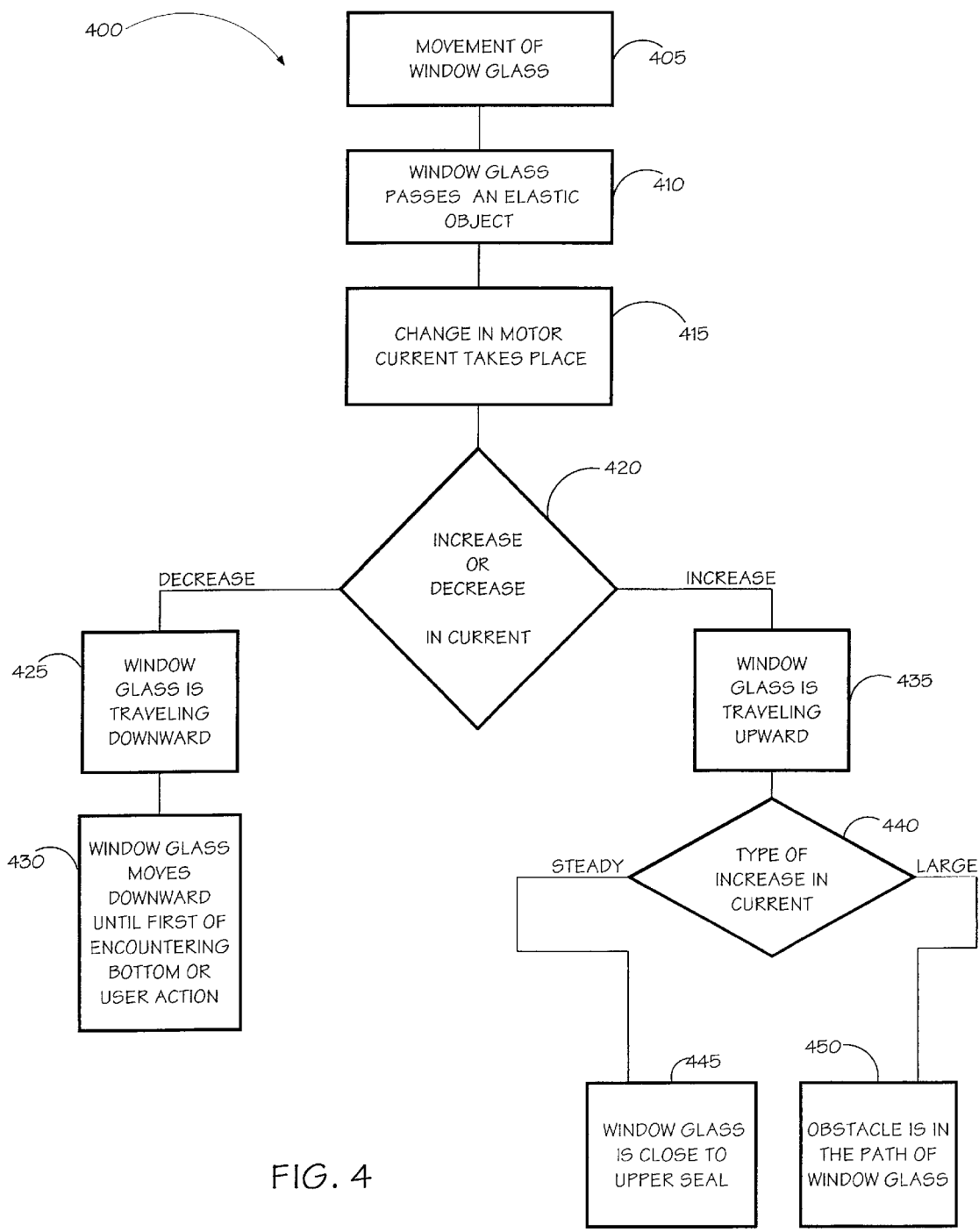
FIG. 4 depicts a flow chart representing an exemplary process of the present invention.

In FIG. 4, an exemplary process 400 for virtually sensing the direction of travel of a window glass and position is described. The process 400 may begin when the window glass begins to move 405 typically by a passenger pressing a switch. As the window glass moves, it may pass an elastic object 410. When the window glass passes an elastic object, a change in the motor current may take place 415.

The controller of the present invention may determine whether the current increased or decreased when the window glass passed an elastic object 420. If the current decreased, then the controller may be aware that the window glass is traveling downward 425. The window glass may continue to travel downward until it first reaches the bottom or is stopped by a passenger or user 430. If the controller notices an increase in current, then the controller may be aware that the window glass is traveling upward 435.

Depending upon the amount of current increase 440, the controller of the present invention may determine whether an obstacle is located in the path or if the window glass is approaching the upper seal of the window. For example, if a large current surge is detected, then an obstacle is in the path 450. However, if there is a steady increase in current, then the window glass is close to the upper seal 445. Once a particular amount of current is detected by the controller, then the top of the window glass has reached the obstacle-free region 310 as shown in FIG. 3.

Referring generally to FIGS. 2–4, exemplary embodiments of the present invention include an elastic object. Generally, the elastic object may provide a resistive force to the window glass when the window glass is traveling upward, yet provide an impelling force to the window glass when the window glass is traveling downward. Examples of elastic objects include a spring, rubber, stretchable rope, and roughened patches. It should be understood that the list of elastic objects is not exclusive and other types of elastic objects may be utilized with the present invention without departing from the scope and spirit of the present invention.

Figure 5:
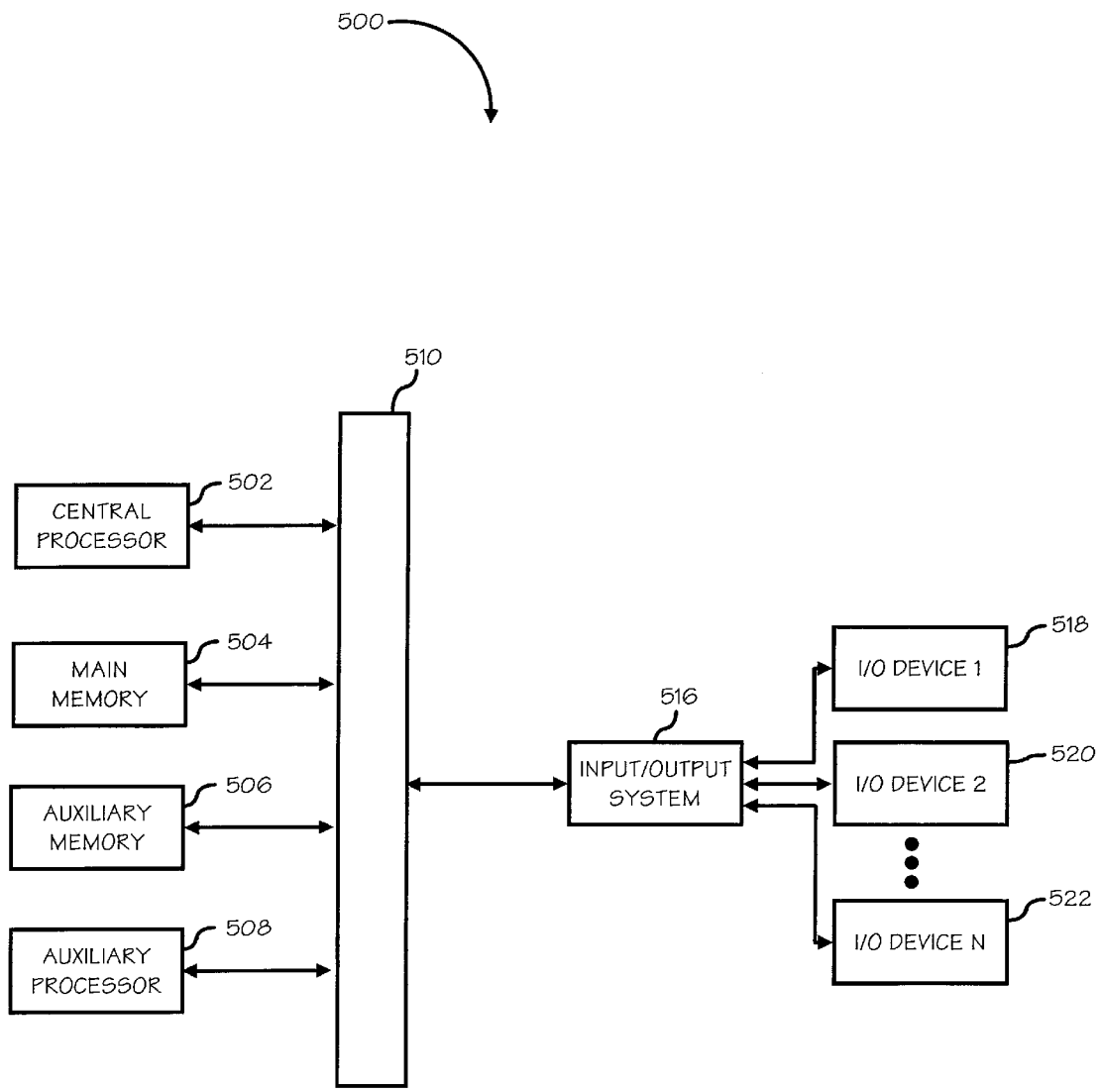
FIG. 5 is a block diagram of a computer based control system suitable for use with the virtual sensor system of the present invention.

Referring now to FIG. 5, a hardware system in accordance with the present invention is shown. The hardware system shown in FIG. 5 is generally representative of the hardware architecture of a controller embodiment of the present invention. Computer system 500 may be configured to implement one or more subsystems of the virtual sensor system 200 of FIG. 2, for example, as an embodiment of controller 250. Central processor 502 includes a central processing unit such as a microprocessor or microcontroller for executing programs, performing data manipulations and controlling the tasks of computer system 500.

Other components of computer system 500 include main memory 504, and auxiliary memory 506. Main memory 504 provides storage of instructions and data for programs executing on a central processor 502. Main memory 504 is typically semiconductor based memory such as dynamic random access memory (DRAM) and or static random access memory (SRAM). Auxiliary memory 506 provides storage of instructions and data that are loaded into the main memory 504 before execution. Auxiliary memory 506 may include may include semiconductor-based memory such as read-only memory (ROM), programmable read-only memory (PROM) erasable programmable read-only memory (EPROM), electrically erasable read-only memory (EEPROM), or flash memory (block oriented memory similar to EEPROM). Other varieties of memory devices are contemplated as well.

Computer system 500 may further include an input/output (I/O) system 516 for connecting to one or more I/O devices. Input/output system 516 may comprise one or more controllers or adapters for providing interface functions between one or more of I/O devices 518–522. Input/output system 516 and I/O devices 518–522 may provide or receive analog or digital signals for communication between computer system 500 of the present invention and external devices, networks, or information sources.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for determining direction of travel and position of a window as between one of two regions, comprising:

(a) a path for a window to travel;

(b) at least one elastic object located in said path;

(c) a motor capable of moving said window along said path;

(d) a current sensing device operatively connected to said motor; and (e) a controller operatively connected to said current sensing device, wherein a change of current occurs in said motor when said window encounters said elastic object and wherein said controller is capable of determining the location of said window as between one of two locations based on a real-time current measured in said motor.

2. The apparatus as claimed in claim 1, wherein said elastic object comprises at least one of a spring, roughened patch, rubber material and stretchable rope.

3. The apparatus as claimed in claim 1, wherein said motor is an electric motor.

4. The apparatus as claimed in claim 1, wherein said current increases when said window glass travels upward while encountering said elastic object.

5. The apparatus as claimed in claim 1, wherein said current decreases when said window glass travels downward while encountering said elastic object.

6. A method of determining when a window passes a predefined location, comprising the steps of:

(a) placing an elastic object in a path for said window;

(b) connecting a motor capable of moving said window along said path;

(c) measuring current in said motor;

wherein said elastic object is placed at a predefined location and a change in current occurs in said motor when said window encounters said elastic object thus alerting a controller that said window glass is passing said predefined location.

7. The method as claimed in claim 6, wherein said elastic object is at least one of a spring, roughened patch, rubber material, and stretchable rope.

8. The method as claimed in claim 6, wherein said motor is an electric motor.

9. The method as claimed in claim 6, wherein said current in said motor increases when said window travels upward while encountering said elastic object.

10. The method as claimed in claim 6, wherein said current in said motor decreases when said window travels downward while encountering said elastic object.

11. An apparatus for determining direction of travel and position of a window as between one of two regions, comprising:

(a) routing means for a window to travel;

(b) elastic means located in said routing means;

(c) moving means for transporting said window connected to said window;

(d) measuring means operatively connected to said moving means capable of measuring current in said moving means;

(e) processing means operatively connected to said measuring means, wherein a change of current occurs in said moving means when said window encounters said elastic means and wherein said processing means is suitable for determining direction of travel and position of said window as between one of two regions based on a real-time current measured by said moving means.

12. The apparatus as claimed in claim 11, wherein said elastic means is at least one of a spring, roughened patch, rubber material and stretchable rope.

13. The apparatus as claimed in claim 11, wherein said moving means is an electric motor.

14. The apparatus as claimed in claim 11, wherein said measuring means is a current sensing device.

15. The apparatus as claimed in claim 11, wherein said current increases when said window travels upward while encountering said elastic means.

16. The apparatus as claimed in claim 11, wherein said current decreases when said window travels downward while encountering said elastic means.

* * * * *